Figure 1:
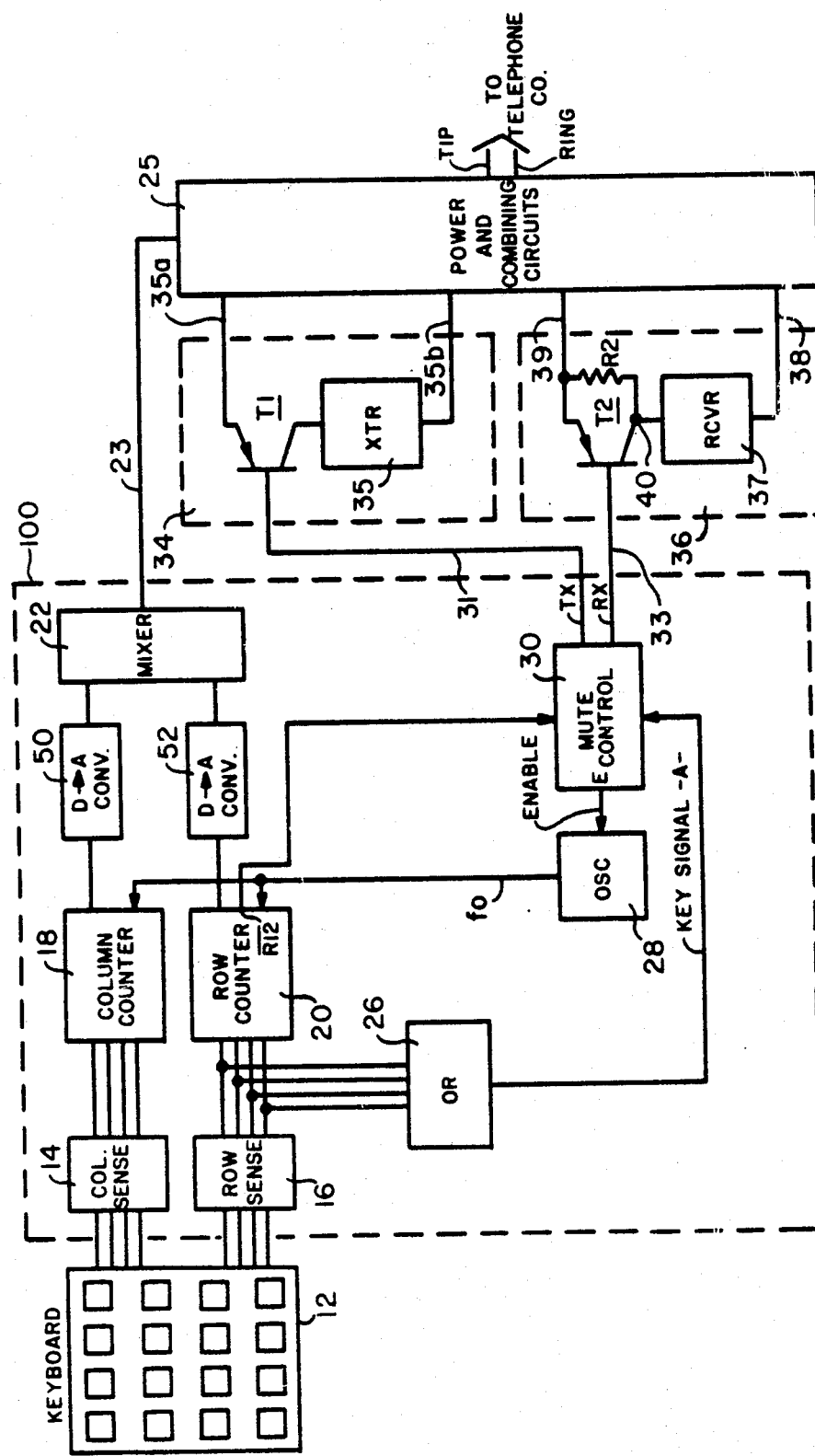

United States Patent [19]

Wilson

[11] Patent Number: 4,472,601
[45] Date of Patent: Sep. 18, 1984

[54] CONTROL CIRCUIT FOR TELEPHONE RECEIVER AND TRANSMITTER

[75] Inventor: Robert E. Wilson, Whitehouse Station, N.J.

[73] Assignee: RCA Corporation, New York, N.Y.

[21] Appl. No.: 398,382

[22] Filed: Jul. 14, 1982

[51] Int. Cl.³ .............................................. H04M 1/50
[52] U.S. Cl. ............................ 179/81 R; 179/84 VF; 179/90 K
[58] Field of Search ............. 179/81 R, 84 VF, 90 K, 179/90 D, 167, 158 R

[56] References Cited

U.S. PATENT DOCUMENTS 3,525,819  8/1970  Jackson .
3,544,731 12/1970  Cowpland .
3,778,556 12/1973  Mees et al. ........................ 179/90 K
3,787,836  1/1974  Hagelbarger ................. 179/90 K X
3,941,942  3/1976  Nash ................................. 179/90 K
3,978,295  8/1976  van der Plaats ............... 179/84 VF
4,061,886 12/1977  Callahan Jr. et al. ......... 179/84 VF
4,196,318  4/1980  Nelson .......................... 179/84 VF
4,303,907 12/1981  Wilson ......................... 179/90 K X Primary Examiner—A. D. Pellinen
Assistant Examiner—James L. Dwyer
Attorney, Agent, or Firm—Joseph S. Tripoli; George E. Haas; Henry I. Schanzer

[57] ABSTRACT

In a telephone subscriber set, circuitry is provided for muting the receiver prior to disabling the transmitter and for enabling the transmitter prior to removing the muting from the receiver.

5 Claims, 3 Drawing Figures

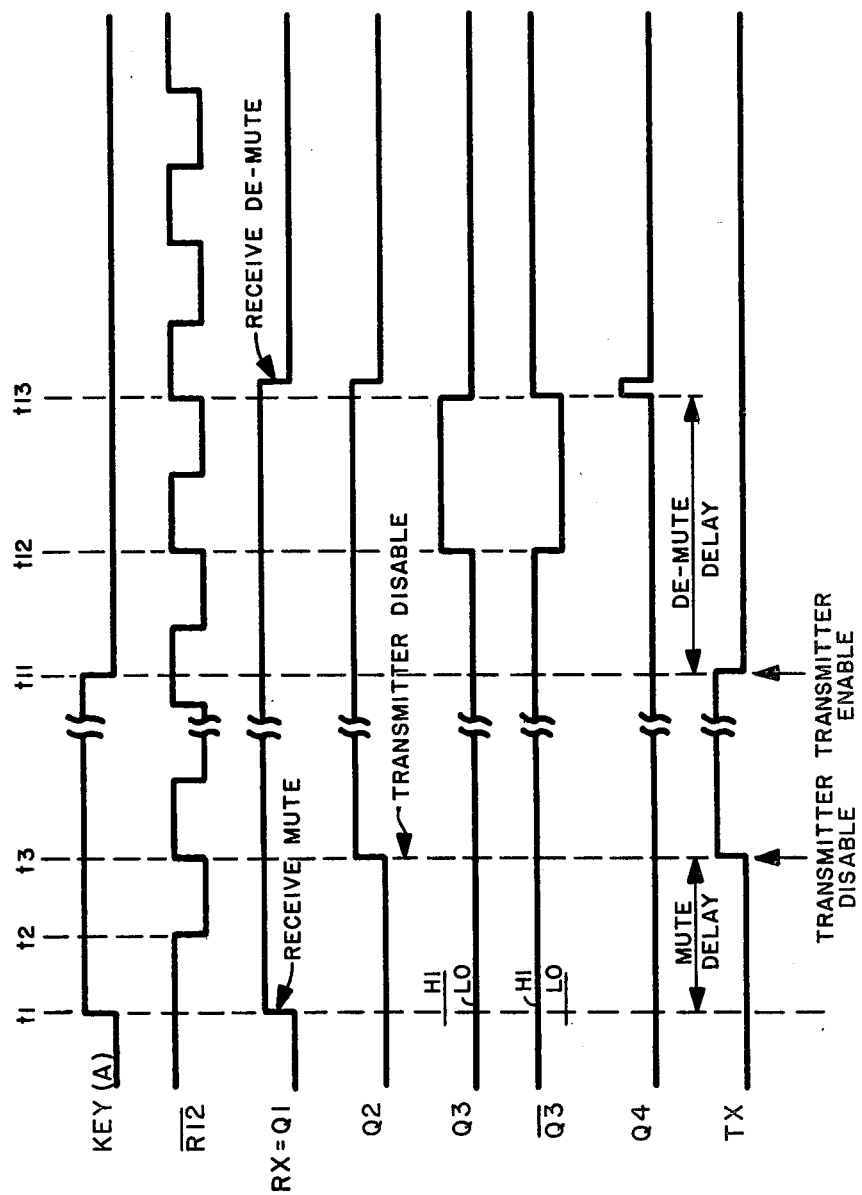

CONTROL CIRCUIT FOR TELEPHONE RECEIVER AND TRANSMITTER

This invention relates to subscriber telephone sets and more particularly to circuitry for controlling the turn-on and turn-off of the telephone's receiver and transmitter.

In the art of telephony, a dual-tone dial signal may be initiated by depressing a push button. During a dialing operation the telephone transmitter is normally disabled to reduce the possibility of the transmitter picking up noise or voice frequencies and applying them to the line and thereby causing erroneous dial signals. When the transmitter is turned-off (disabled) or turned-on (enabled) a relatively heavy current flow through the transmitter is interrupted or initiated, producing an audible noise. To limit to a comfortable level the magnitude of the signal that reaches the ear of the subscriber, the signals applied to the telephone receiver during the generation of dial signals are attenuated (muted). The attenuation of the dial signals allows the subscriber to comfortably heat the signals being generated while providing assurance as to the operability of the dial. It is, therefore, desirable to mute the receiver prior to turning-off the transmitter and to turning-on the transmitter prior to "un-muting" (i.e. removing the muting or fully enabling) the receiver.

Presently available push button dial systems make use of expensive mechanical arrangements to control the order in which the transmitter and receiver are turned-on and off in response to the initiation and termination of a dial signal. To overcome the problems with the mechanical systems, electronic systems responsive to push-button operation are being developed. One of these is an integrated circuit (IC) designated as the CD22859 which is a Dual-Tone Multifrequency Tone Generator manufactured by RCA Corporation. In addition to producing a unique signal indicative of a selected row and column, the CD22859 provides signals to control the muting of the telephone transmitter and receiver. However, the timing of the respective muting control signals is nearly simultaneous and is generally not sufficiently offset in time to prevent the transmitter current transient from being heard in the receiver. Therefore, discrete components in addition to the circuitry on the IC are needed to produce the desired delays between the turn-on and turn-off of the receiver and transmitter. This is undesirable because adding components is expensive and requires much space.

Circuits embodying the invention include control means coupled to a fixed frequency timing source which, in response to the initiation of a dialing signal, first mute the receiver and then, at a later time, disable the transmitter and, in response to the termination of the dialing signal, first enable the transmitter and then, at a later time de-mute (i.e. remove the muting) the receiver. As the timing source is used to control the delays between the respective turn-on and turn-off of the receiver and transmitter these delays can be well controlled and the audible noise caused by the disabling and the enabling of the transmitter thereby can be more effectively decoupled from the receiver.

Figure 2:
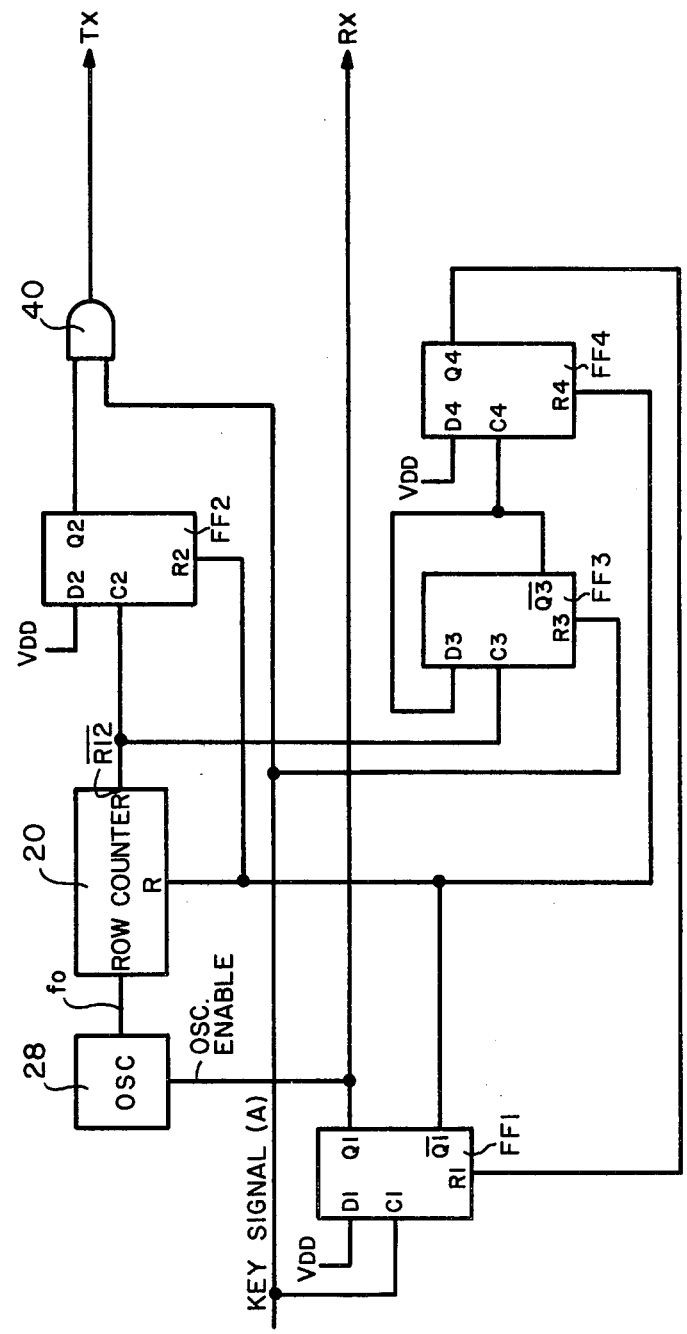

FIG. 1 is a simplified block diagram of part of a telephone subscriber set embodying the invention; and FIG. 2 is a logic diagram of muting control circuitry embodying the invention.

FIG. 1 includes a keyboard 12 which may be of the type described in U.S. Pat. No. 4,303,907 or of the type for use with the RCA Corporation part No. CD22859 and shown in its associated data sheet. The keyboard includes an array of sixteen push-button switches arranged to provide an output for each of the four rows and each of the four columns. Following a switch closure, signals are produced indicating the column and the row associated with the depressed switch. A column sensing circuit 14 is connected to the keyboard circuit 12 to sense which column conductor was activated. Similarly, a row sensing circuit 16 is coupled to the keyboard circuit 12 to sense which row conductor was activated. The column sensing circuitry is coupled to a column counter 18 while the row sensing circuit is coupled to a row counter 20. A selectively enabled oscillator 28 is coupled to counters 18 and 20.

When enabled, oscillator 28 produces an output signal of frequency (fo) which is applied to counters 18 and 20. In response to $f_o$ and the particular row and column selected, counters 18 and 20 produce output signals whose frequencies are indicative of the selected column and row switch. That is, the row and column sense circuitry in conjunction with the row and column counters include means for dividing $f_o$ by a different number depending on which row or column switch is depressed.

The outputs of counters 18 abd 20 are applied via digital-to-analog converters 50 and 52, respectively, to a mixer 22 which is used to produce a dual tone signal. The latter is coupled via main output line 23 to power and combining circuits 25 which then couple the signal onto the Tip and Ring lines coupled to the main telephone system.

In the system of FIG. 1 the outputs of row sensing circuit 16 are OR'ed by means of an OR gate 26 whose output produces a positive going Key signal (A) each time a push-button switch (key) is depressed. The Key signal is fed to mute control circuitry 30 having an output (E) which controls the turn-on (enable) and turn-off (disable) of oscillator 28. In this example, whenever the Key signal goes positive, the mute control circuit 30 enables oscillator 28. When enabled, oscillator 28 produces a fixed frequency signal $f_o$ which is applied to column and row counters 18 and 20, respectively.

An output $\overline{R12}$ of row counter 20 is fed back to mute control 30 to provide timing signals to the latter. The last output (i.e. $\overline{R12}$) of the row counter divider chain is selected as the timing signal for operating the mute control because it is the lowest frequency output of the counter. However, another output from the row counter (from an earlier stage of the counter) or from the column counter may be selected instead. Note that in this design, the frequency of the signal at $\overline{R12}$ varies as a function of which row is selected, since the counter divider ratio is a function of the selected row (or column). Hence, four different row frequencies (as well as four different column frequencies) are generated. However, analysis indicated that the system operated satisfactorily over the whole frequency range of $\overline{R12}$ signals produced by counter 20. Accordingly, counter 20 used to produce the two tones is also used to produce the timing signal for the mute control circuit 30. If the timing signal had to be a fixed frequency, regardless of the row selected, then a separate counter might be necessary.

Mute control 30 has an output designated TX coupled via a line 31 to a telephone transmitter section 34 to control the turn-on (enable) and turn-off (disable) of a transmitter 35 and an output designated RX coupled via a line 33 to telephone receiver section 36 to control the muting and "un-muting" (or "de-muting") of a receiver 37. For ease of illustration the transmitter and receiver control circuitry shown in boxes 34 and 36 respectively has been simplified. The transmitter section 34 includes a transmitter 35 connected via a transistor T1 between two power lines 35a and 35b which are connected back to the power source 25. T1 is a PNP transistor to the base electrode of which the signal TX is applied and whose collector-to-emitter path is connected in series with transmitter 35. The receiver section 36 includes a receiver 37 connected at one terminal to a line 38 and at its other terminal to an intermediate node 40. The receiver's muting network connected between node 40 and a line 39 includes the parallel combination of the collector-to-emitter path of a PNP transistor T2 across which is connected a muting resistor R2. The base of T2 is connected via line 33 to RX, and lines 38 and 39 are connected back to power source 25.

When transistor T1 is turned-off (i.e. a "high" signal is applied to its base) the transmitter is disabled and totally muted in that no current can flow through it. When transistor T1 is turned-on (i.e. a "low" signal is applied to its base) the transmitter is enabled since it is connected between lines 35a and 35b via the low ON impedance of T1.

When transistor T2 is turned-off (i.e. a high signal is applied to its base) the receiver is muted. That is, the receiver is then connected between lines 39 and 38 via resistor R2 which limits the current level through the receiver and decreases the magnitude of the signal to the receiver. When T2 is turned-on (i.e. a "low" signal is applied to its base) resistor R2 is essentially shorted out via the relatively low ON impedance of T2 and essentially the full magnitude of the signal is then applied to the receiver.

The detailed operation of the circuit embodying the invention is best understood by referring to the logic diagram of FIG. 2 and the accompanying waveform diagram shown in FIG. 3.

The circuit of FIG. 2 includes oscillator 28, row counter 20, four D-type flip-flops FF1, FF2, FF3 and FF4, and an AND gate 40. The D-type flip-flops are clocked flip-flops whose Q output assumes the state of the data (D) input only on a low-to-high transition of the clock (C) input (i.e. the signal applied to the "C" input of the flip-flop).

As noted above, whenever a key is depressed a row and a column sense circuit is activated. The outputs of the row sense circuit 16 (FIG. 1) are OR'ed via OR gate 26 to produce a positive going Key signal (A) whenever a key is depressed and a low output (A="0" or low) when the key is released. It should be evident that the output of column sense circuit 14 could have been used instead to produce a like signal indication. The Key (A) signal is applied to the clock input (C1) of FF1, to the reset input (R3) of FF3 and to one input of AND gate 40. As shown for time $t_1$, in FIG. 3, when Key signal A goes high, the clock input (C1) of FF1 goes high, causing the Q output (Q1) of FF1 to go high and $\overline{Q1}$ to go low. FF3 is reset and $\overline{Q3}$ remains high while gate 40 is enabled. When Q1 goes high it enables oscillator 28 and concurrently mutes the receiver. The receiver is muted when Q1 goes high since a high signal is applied to the base of T2, turning it off. When $\overline{Q1}$ goes low the reset signal is removed from counter 20, FF2 and FF4. As soon as $\overline{Q1}$ goes low and the reset to counter 20 is removed, the oscillator output $f_o$ applied to counter 20 is divided down by means of the several binary stages forming counter 20. An output, designated as $\overline{R12}$, of counter 20 is applied to mute control circuit 30 and is used as the timing signal for generating the delays in circuit 30. Due to the reset control function of $\overline{Q1}$, $\overline{R12}$ is held high when the Key signal A first goes high. Assuming an $f_o$ of approximately 3.5 MHz, the output $\overline{R12}$ of row counter 20 makes a low-to-high transition approximately 0.5 to 0.7 milliseconds after oscillator 28 is enabled and after the receiver is muted. It should be evident that additional count down stages could be added to counter 20 and/or that different points on the divider chain of row counter 20 (or column counter 18) could be selected to provide a timing signal having a different frequency than $\overline{R12}$.

When $\overline{R12}$ makes a low-to-high transition (i.e. at time $t_3$ in FIG. 3) the output Q2 of FF2 goes high since Q2 then assumes the high state (i.e. $V_{DD}$) applied to data input D2. As soon as Q2 goes high, the two inputs (A and Q2) applied to AND gate 40 are high causing its output TX to go high. When TX goes high, transistor T1 is turned-off and the transmitter 35 is disabled.

At the termination of a dialing operation, the Key signal (A) returns to the low level (time $t_{11}$ in FIG. 3). When A goes low, the output TX of AND gate 40 goes low. This turns-on transistor T1 and transmitter 35 is again enabled. Concurrently, as soon as A goes low, the positive reset signal formerly applied to FF3 is removed. Therefore, FF3 which was being held in the reset condition (i.e. Q3=low; $\overline{Q3}$=High) can now change state as a function of its clock input which is $\overline{R12}$. On the first low to high transition of $\overline{R12}$ (e.g. at time $t_{12}$ in FIG. 3) following the return of the key signal to ground, $\overline{Q3}$ changes value from a high level to a low level. $\overline{Q3}$ is connected to the clock input (C4) of FF4, but the negative going transition of $\overline{Q3}$ does not cause a change in Q4. On the second low-to-high transition of $\overline{R12}$ (e.g. at time $t_{13}$ in FIG. 3) following the return of A to ground, $\overline{Q3}$ switches from low-to-high.

The time between release of a key switch and the low to high transition of Q3 is a minimum of approximately 1 millisecond and a maximum of approximately 3 milliseconds. The low to high transition of $\overline{Q3}$ at time $t_{13}$ causes the output Q4 of FF4 to go from low to high. Q4 is applied to the reset input R1 of FF1. Hence, when Q4 goes high, FF1 is reset causing Q1 to go low and $\overline{Q1}$ to go high. As soon as Q1 goes low T2 is turned-on, removing the muting from receiver 37 and the full signal is now applied to receiver 37. When Q1 goes low, oscillator 28 is turned-off. Concurrently $\overline{Q1}$ goes high resetting row counter 20, FF2 and FF4, while FF3 is left in the condition of Q3 low and $\overline{Q3}$ high. This leaves the circuit restored to its initial steady state condition (just prior to A going from low-to-high) with Q1=low, Q2=low, $\overline{Q3}$-high and Q4=low, and the counter 20 reset to a zero count condition.

It should be appreciated that circuitry such as oscillator 28 and row counter 20 are presently available on the integrated circuit CC22859 cited above. By using such existing circuitry a mute control circuit can be built using very few additional components (only 4 flip-flops and an AND gate in the example illustrated). Moreover, as with the sense circuits 14 and 16, counter circuits 18 and 20, oscillator 28 and mixer 22 these additional components are easily integratable on the same IC as the rest of the circuitry. Thus, all the circuitry shown in block 100 of FIG. 1 can be manufactured on the same integrated circuit resulting in a highly efficient design.

The mute control circuitry has been shown using several flip-flops and a logic gate. It should be evident that other, equivalent logic configurations may be used to accomplish the desired muting sequence.

What is claimed is:

1. A circuit for controlling the sequence in which the transmitter and the receiver of a telephone are turned-on and turned-off in response to the activation of a selected key on a keyboard connected to said circuit comprising:

first means for generating a fixed frequency;

counting means coupled to said first means for dividing down said fixed frequency and for producing a tone responsive to, and indicative of, a key being activated; and control means, responsive to the activation of a key, coupled to said counting means and to said transmitter and receiver for, in response to the activation of a key, first muting said receiver and subsequently thereto in response to a first count derived from said counting means, disabling said transmitter and for, in response to the deactivation of said key, first enabling said transmitter and, subsequently thereto, in response to a second count derived from said counting means, de-muting said receiver.

2. The circuit as claimed in claim 1 wherein said first means comprises a selectively enabled oscillator and wherein said control means is coupled to said oscillator and includes means for enabling said oscillator in response to the activation of a key and for disabling said oscillator a given time after the deactivation of said key.

3. The circuit as claimed in claim 2 wherein said oscillator, said counting means, and said control means are all formed as part of the same integrated circuit.

4. The circuit as claimed in claim 2 wherein said control means includes:

a first bistable means responsive to the activation of a key for first muting said receiver and concurrently enabling said oscillator; a second bistable means and gating means responsive to the activation of a key and to the occurrence of said first count for disabling said transmitter; said second bistable means being responsive to the deactivation of said key for enabling said transmitter; and third and fourth bistable means responsive to the deactivation of said key and to the count derived from said counting means for enabling said receiver and disabling said oscillator upon the occurrence of said second count.

5. The combination as claimed in claim 2 wherein said oscillator is the sole frequency and timing generating means in said circuit.

* * * * *